United States Patent Office 3,380,293
Patented Apr. 30, 1968

3,380,293
ULTRASONIC INSPECTION APPARATUS
John H. Murphy, 2339 Tilbury Ave.,
Pittsburgh, Pa. 15217
Filed May 20, 1965, Ser. No. 457,398
10 Claims. (Cl. 73—67.7)

ABSTRACT OF THE DISCLOSURE

Ultrasonic inspection apparatus, and more particularly apparatus for measuring the contour of the surface of a solid object such as sheet steel or other substantially solid material, both moving and stationary. A plurality of ultrasonic transmitter-receiver pairs are positioned over the width of the object. The signals reflected from the object surface are displayed on a cathode ray tube indicator as a series of spots across the face of the tube and have a configuration indicative of the contour of the object.

---

It is an object of the present invention to provide an improved inspection system for the determination of the contour or deviation from a desired contour by ultrasonic means.

Another object of the invention is to provide a contour gaging system which indicates the flatness or deviation from flatness of a solid surface such as a sheet of steel or other metal.

It is yet another object of the present invention to provide an improved ultrasonic contour gaging apparatus which is capable of measuring and indicating the flatness of sheet steel as it is produced and fed off a rolling mill or the like.

Briefly, the subject invention comprises an ultrasonic transducer assembly positioned above the surface of the object to be analyzed and, in the case where the invention is used to inspect a moving sheet of steel or the like, the transducer assembly is positioned above the sheet transverse to the movement thereof. The transducer assembly comprises a plurality of electroacoustic transmitting and receiving transducers selectively spaced along the assembly so that substantially the complete width of the surface to be analyzed is covered. The transducers are operated in pairs such that for every transmitting transducer there is a corresponding receiver transducer forming a transmitter-receiver pair. A pulse train of high frequency electrical energy is fed to the transducer assembly where it is converted to ultrasonic energy by the transmitter transducers and directed to the surface to be analyzed. The reflected ultrasonic energy is then picked up by the receiver transducers. By measuring the time delay of the travel of the sonic energy from each transmitting transducers to its respective receiver transducer, the distance from any transmitter-receiver pair to the surface being analyzed can be determined. In the instant invention, the time delay of each transmitter-receiver pair is successively displayed on the screen of a cathode ray tube for visual comparison of the comparative distance from the surface of all of the transmitter-receiver pairs giving an accurate indication of the contour of the surface at that particular location along its length.

Other objects and advantages will become apparent as the following detailed description is read in conjunction with the accompanying drawings where like reference numerals refer to like components, and in which.

Figure 1:
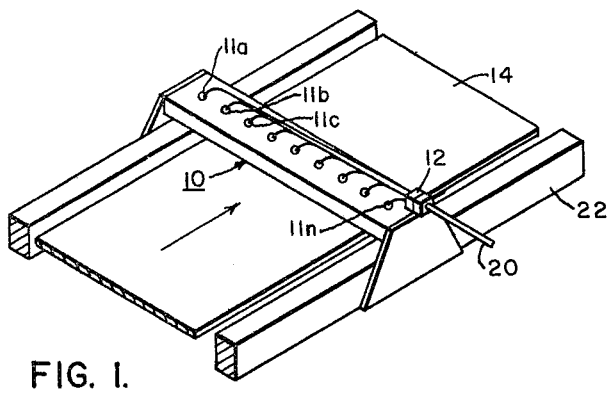
FIGURE 1 is a drawing illustrative of one embodiment of the transducer assembly mounted above and transverse to a moving sheet of material to be analyzed.

Referring now more particularly to the drawings, FIG. 1 discloses a transducer assembly 10 mounted above and across the upper surface of a moving sheet 14 which is being fed along a conveyor means 22. The transducer assembly 10 thus located is shown comprising a plurality of electroacoustic transducer means $11_a$, $11_b$ and . . . $11_n$ selectively spaced at desired intervals so that they substantially cover the entire width of the surface of the moving sheet 14. The transducer means $11_a$–$11_n$ comprise ultrasonic transmitting transducers; and associated with each transmitting transducer is a respective receiving transducer so that every transmitting transducer 16 will have a corresponding receiver located across the top of the moving sheet 14. An electrical cable assembly 20 is coupled to the transducer assembly 10 from electrical circuitry, hereinafter described in detail, through a connector 12. Electrical signals are coupled to and from the transducer assembly 10 by means of cable assembly 20.

Figure 2:
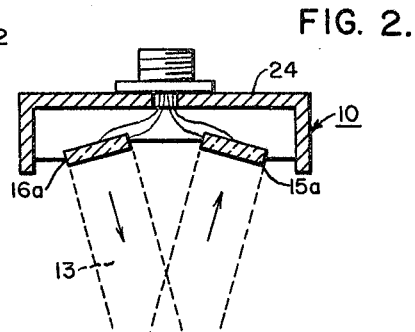
FIG. 2 is a partial cross-sectional view of the embodiment shown in FIG. 1.

FIG. 2 illustrates in greater detail the transducer assembly 10 seen in partial cross section. The moving sheet 14 is fed in a predetermined direction by means of the rollers 23 which form a part of the conveyor means 22 illustrated in FIG. 1. The transducer assembly 10 is shown comprising a housing 24 upon which is mounted the electrical connector 12. Within the housing 24 are a plurality of transmitting transducers 16 arranged in a linear array such that their radiating surfaces are directed to the suface of the moving sheet 14. An air medium separates the transducers from the moving sheet 14. The transmitting transducers 16 are electroacoustic devices which will produce high frequency ultrasonic sound waves upon being excited by an electrical signal coupled thereto. Transducers capable of generating ultrasonic waves from electrical signals are well known to those skilled in the art; and, therefore, the transmitting transducers utilized in the present invention may be of any convenient design, where operating frequencies from 16 kilocycles to 2 megacycles, and preferably 500 kilocycles to 1 megacycle are utilized.

Also located within the housing 24 are a plurality of receiving transducers 15 arranged in a linear array and located adjacent the array of transmitting transducers 16 such that sonic energy emanating from the transmitting transducers is reflected from the surface of the moving sheet 14 to the receiving transducers 15. The receiving transducers act to convert the reflected ultrasonic energy into an electrical signal. The transmitting transducers 16 and the receiving transducers 15 are operated in pairs such that for each transmitting transducer there is one receiving transducer, the transducers $16_a$ and $15_a$ being shown as examples in FIG. 2.

The mode of operation of the subject invention is as follows:

All of the transmitting transducers 16 are driven by a pulse or burst of high frequency voltage from a signal generator, hereinafter described. The front surface of the transmitting transducers are caused to vibrate, sending an acoustical wave 14 through the air to the surface to be analyzed. The acoustic wave 13 is reflected from the surface and travels toward the receiving transducer 15 causing its front surface to vibrate, thus generating an electrical voltage of the same frequency as the signal driving the transmitting transducer 16. The received wave will be delayed from the transmitted wave by a time proportional to the total distance traveled and inversely proportional to the speed of sound in the air. The plurality of pairs of transducers (one transmitting transducer and one receiving transducer) are spaced at predetermined intervals across the surface to be analyzed, such that a comparison of the time delays from each pair of transducers will give an indication of the flatness or contour of the reflecting surface.

Figure 3:
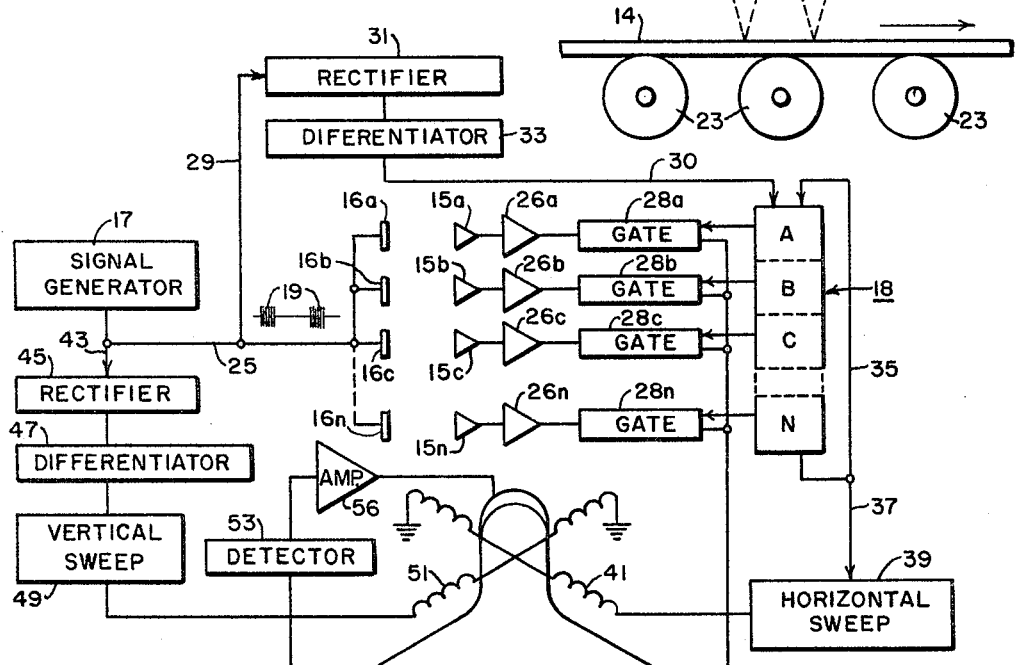
FIG. 3 is an electrical block diagram of the preferred embodiment of the subject invention.

Referring now to FIG. 3, there is disclosed a block diagram of the preferred embodiment of the complete system illustrative of the subject invention. A signal generator 17 capable of producing suitable high frequency electrical pulses for driving ultrasonic transducers is shown coupled to the plurality of transmitting transducers $16_a$, $16_b$, $16_c$ . . . $16_n$ by means of suitable circuit means 25. Circuit means 25 comprises part of cable assembly 20 shown in FIG. 1. Spaced apart from the transmitting transducers $16_a$ . . . $16_n$ are the plurality of receiving transducers $15_a$, $15_b$, $15_c$ . . . $15_n$ such that transducer $16_a$ is adapted to operate in combination with transducer $15_a$, etc. to form a plurality of transmitter-receiver pairs. Coupled to each receiving transducer $15_a$–$15_n$ is a respective preamplifier circuit $26_a$–$26_n$. The outputs of the preamplifiers $26_a$–$26_n$ are coupled respectively to gate circuits $28_a$–$28_n$. The preamplifiers $26_a$–$26_n$ can be of any convenient design suitable for amplifying signals received from the receiving transducers $15_a$–$15_n$. The gate circuits $28_a$–$28_n$ are preferably coincidence gates commonly referred to as AND circuits, and operate to produce an output signal only when all input terminals to the circuit receive an input signal. The operation of the gate circuits $28_a$–$28_n$ in connection with the subject invention will be discussed in greater detail subsequently.

Also connected to the output of the signal generator 17 is a circuit means 29 coupled to a rectifier circuit 31 which, in turn, is coupled to a differentiator circuit 33. The output of the differentiator circuit is fed to one input of scanning means 18, comprising an electronic shift register, by means of circuit lead 30. The shift register 18 has a plurality of sections (A–N), the same in number as the number of transducer transmitter-receiver pairs $11_a$–$11_n$. A signal output from section A of shift register 18 is coupled to one input of the gate circuit $28_a$, the output from section B is coupled to gate circuit $28_b$, and so on. A feedback circuit 35 is coupled from the $n$th section of shift register 18 back to section A for resetting the shift register after it has counted from 1 to $n$ upon being triggered by pulses from the differentiator circuit 33. The output of the $n$th section of the shift register 18 is also fed to a horizontal sweep circuit 39 which, in turn, is coupled to horizontal deflection means 41, comprising a deflection coil, for a cathode ray tube 60. The output of the $n$th section of shift register 18 is used to trigger the reset portion of the horizontal sweep circuit 39. The opposite end of the deflection coil 41 is returned to a point of common reference potential illustrated as ground. As will be understood, the horizontal deflection coil 41 is utilized for causing a trace appearing on the face of the cathode ray tube 60 to move in a horizontal path.

Another output of the signal generator 17 is fed to a second rectifier 45 by means of a circuit lead 43. The output of the rectifier 45 is fed to a differentiator circuit 47 which, in turn, is coupled to the vertical sweep circuit 49. The output of the differentiator circuit 47 is used to trigger the reset portion of the vertical sweep circuit 49 which drives the vertical deflection coil 51 of tube 60 so that a vertical trace is produced, this trace being reset each time a trigger is received from the differentiator circuit 47.

As was mentioned above, the output of signal generator 17 comprises a pulse train or series of bursts 19 of high frequency electrical oscillations which cause the transmitting transducers $16_a$–$16_n$ to vibrate in the ultrasonic frequency range. The rectifier circuits 31 and 45 act to recover the pulse envelope of the pulse train 19 from the signal generator 17, thus providing substantially square-wave voltages at their outputs. When desirable, a Schmitt trigger circuit can be utilized in addition to the rectifier circuits to straighten up or "square" the leading edge of the rectifier waveform providing a true square wave. A Schmitt trigger circuit is well known to those skilled in the art and briefly comprises a circuit which is triggered rapidly from one voltage state to another when a voltage of a predetermined amplitude is applied to its input. A Schmitt trigger circuit of this type is sometimes referred to as a squaring circuit.

Completing a description of the block diagram shown in FIG. 3, the output of each gate circuit $28_a$–$28_n$ is fed to a detector circuit 53 suitable for converting pulses of high frequency oscillatory signals into a voltage spike in a manner similar to the action of the rectifier and differentiator circuits referred to above. The voltage spike from the detector 53 is amplified in an amplifier circuit 56 and is subsequently fed to the cathode ray tube 60 for controlling the intensity of the cathode ray tube's electron beam such as by action of the control grid, not shown.

In operation, the signal generator 17 produces pulses 19 of high frequency electrical oscillations which simultaneously cause all of the plurality of transmitting transducers $11_a$–$11_n$ to oscillate at a predetermined ultrasonic frequency, each sending an acoustical wave 13 to the surface of the object being analyzed, whereupon each reflected wave is subsequently received in the respective receiving transducer $15_a$–$15_n$. The electrical signals produced by the receiving transducers $15_a$–$15_n$ are amplified in preamplifiers $26_a$–$26_n$ and then coupled to the gate circuits $28_a$–$28_n$, respectively. The shift register 18 is set each time a pulse is sent from the signal generator 17 advancing the count successively through sections A–N. The rectifier circuit 31 and differentiator circuit 33 develop a trigger pulse causing the shift register to step each time a burst of energy emanates from the transmitting transducers $16_a$–$16_n$. Although signals are received at the gate circuits $28_a$–$28_n$ each time the receiving transducers are activated, only one gate circuit of the plurality of gates $28_a$–$28_n$ is allowed to produce an output signal at any one time. This is due to the fact that the shift register successively gates each gate circuit $28_a$–$28_n$ down the chain until the $n$th gate has been triggered, whereupon the shift register is reset by means of the output signal being fed back to section A by means of circuit 35. Each gated output signal is rectified and differentiated by the detector 53, amplified by amplifier 56 and fed to the intensity control means of cathode ray tube 60. Each time the shift register is reset, the horizontal sweep circuit 39 is caused to reset by means of the input from lead 37, thereby causing the horizontal movement of the cathode ray tube to return to its initial point. Each time a pulse of high frequency oscillations 19 is fed to the transmitting transducers, however, the vertical sweep of the cathode ray tube 60 is caused to be reset. All of the time delays from the plurality of pairs of transducers $16_a$ and $15_a$, $16_b$ and $15_b$, etc. are thus capable of being compared by means of the display on the cathode ray tube 60 since each output signal from the gates $28_a$–$28_n$ received at the receiving transducers is successively gated to the cathode ray tube 60 during one horizontal sweep while the vertical sweep is being reset each time a pulse is sent out from the signal generator 17.

The intensity of the spot generated by the cathode ray tube beam is preferably caused to increase at the instant when the burst of ultrasonic energy is received by a particular receiving transducer 15; however, it should be apparent that it could be decreased when desirable. The vertical position of the spot on the face of the cathode ray tube when its intensity is increased is a measure of the time elapsed between the transmitting and receiving of a respective ultrasonic wave from a transmitter-receiver pair and hence the distance from that particular pair of transducers to the surface being analyzed. The resulting cathode ray tube display is a series of bright (or dim) spots 58 displayed across the screen, the vertical position of each spot from the bottom of the tube being a measure of the distance from a respective pair of transducers to the part of the surface being analyzed by that pair of transducers. If all of the spots are of the same vertical position, all of the distances from the transducer pairs to the surface are the same, indicating flatness. Any deviation from this surface flatness or contour will cause one or more of the spots to change vertical position. In this manner, an amplification of the surface contour is presented to the operator; and in the particular illustration given in FIG. 3, it will be noted that the sheet 14 is bowed, being higher in the center than at the edges.

When desirable, the transducer assembly 10 can be moved over the surface of the object to be analyzed such as when it is desired to measure the contour of a stationary object.

What has been shown and described, therefore, is an improved system for the nondestructive testing and analyzing of the surface of a solid body whether stationary or moving. While there has been shown and described what is at present considered to be the preferred embodiment of the invention, modifications thereto will readily occur to those skilled in the art. For example, when desirable, the results can be recorded on moving graph paper or photographs of the cathode ray tube display can be made for a permanent record thereof. In addition, the time delays could also be measured and analyzed electronically and used to control a specific operation being performed on the surface such as rolling and the like. It is not desired, therefore, that the invention be limited to the specific arrangement shown and described, but it is to be understood that all equivalents, alterations, and modifications within the spirit and scope of the present invention are herein meant to be included.

I claim as my invention:

1. Contour gaging apparatus for a surface being analyzed comprising, in combination: a plurality of pairs of electroacoustic transducers spaced at selected intervals across said surface and at a predetermined distance away from said surface, each of said pairs of electroacoustic transducers comprising one transmitting and one receiving transducer; signal generator means coupled to said plurality of pairs of electroacoustic transducers for simultaneously coupling pulses of electrical energy to all of said transmitting transducers, causing them to transmit sonic waves toward said surface, each wave being reflected from the surface to a respective receiving transducer, the time delay between transmission and reception of said sonic wave for each of said plurality of pairs of electroacoustic transducers being a measure of the distance from said surface to said transducers at said selected intervals; shift register means coupled to each of said receiving transducers; circuit means coupling said signal generator means to said shift register means for causing said shift register means to index each time a pulse of electrical energy is coupled to said transmitting transducers, gate means triggered by the shift register means for successively gating the output of each of said receiving transducers; cathode ray tube means having a horizontal and vertical sweep circuit; circuit means coupled between said signal generator means and said vertical sweep circuit for developing a vertical reset signal each time a pulse of said pulses of electrical energy is coupled to said transmitting transducers; and circuit means coupled between said shift register means and said horizontal sweep circuit for generating a horizontal reset signal each time said shift register means indexes to a predetermined count which is equal to the number of said plurality of pairs of electroacoustic transducers; and circuit means coupling the output of each of said receiving transducers to said cathode ray tube for varying the intensity of the display at the instant said sonic wave is received at said receiving transducer and gated thereto by said shift register means and gate means.

2. An ultrasonic measuring system for determining the flatness and deviation therefrom of a substantially solid surface comprising, in combination: an electrical signal generator providing a pulse train of high frequency oscillations; a transducer assembly comprising a first array of a plurality of electroacoustic transducers acting as transmitter transducers coupled to said signal generator and being activated by said high frequency oscillations for producing ultrasonic waves which are directed to said solid surface; and a second array of a plurality of electroacoustic transducers acting as receiver transducers located adjacent said transmitter transducers, said pluarilty of transmitter transducers and receiver transducers being adapted to operate as a plurality of transmitter-receiver pairs for measuring the respective time delay of the travel of the respective ultrasonic waves which are transmitted from said transmitter transducers and received at said receiver transducers after being reflected from said substantially solid surface; means for positioning said transducer assembly a predetermined distance above said substantially solid surface; indicator means; scanning means controlled by said signal generator for coupling each of said receiver transducers of said transmitter-receiver pairs one at a time in a predetermined order to said indicator means to provide a display of each time delay of said transmitter-receiver pairs; and control means coupled to said indicator means from said scanning means and said signal generator for synchronizing said display so that each said time delay may be compared to another, flatness and deviation therefrom being determined by the comparison of each time delay.

3. Apparatus for analyzing the surface of a moving sheet of material for determining the contour thereof comprising, in combination: signal generator means providing an output of pulses of high frequency oscillations of a predetermined frequency; a transducer assembly comprising a linear array of a plurality of ultrasonic transmitting transducers, coupled to said signal generator for generating ultrasonic waves to be directed to said moving sheet, another linear array of a plurality of ultrasonic transducers acting as receivers located adjacent said transmitters so that one transmitter and one receiver cooperate to form a plurality of transmitter-receiver pairs for measuring the time delay of the travel of said ultrasonic waves from said transmitters to said moving sheet and thence to said receivers; means for locating said transducer assembly in air transverse to the direction of movement of said moving sheet such that substantially the entire width of said moving sheet is covered by said transducer assembly; indicator means for providing a display of said time delay of each of said plurality of transmitter-receiver pairs; scanning means coupled to said receivers including means controlled by said pulses from said signal generator means for successively gating each output of said receivers of said plurality of transmitter-receiver pairs to said indicator means; and reset means coupled to said indicator means from said scanning means and said signal generator for causing said display to indicate each said time delay so that a comparison can be made.

4. Apparatus for analyzing the contour of the surface of substantially solid material comprising, in combination: a plurality of pairs of electroacoustic transducers mounted a predetermined distance away from said surface such that said solid material may be moved freely beneath said plurality of pairs of electroacoustic transducers, each of said pair of electroacoustic transducers being comprised of a transmitter and a receiver; a pulse generator, producing pulsed electrical signals, coupled to said plurality of pairs of electroacoustic transducers, each of said transmitters being responsive to electrical signals for producing an ultrasonic wave which is directed to said surface of substantially solid material and being reflected therefrom to its respective receiver; indicator means for providing a display of the time delay between transmission and reception of said ultrasonic wave for each pair of said plurality of pairs of electroacoustic transducers; and gating means for selectively coupling each of said receivers to said indicator means so that an individual presentation is provided for each time delay; and indicator control means coupled to said gating means and said pulse generator means for controlling said display so that a comparison of the respective time delay of each of said plurality of pairs of electroacoustic transducers provides an indication of the surface contour of said substantially solid sheet material.

5. Apparatus as set forth in claim 4, wherein said indicator means comprises a cathode ray tube and wherein said indicator control means comprises means for controlling the horizontal and vertical sweep thereof for providing a plurality of substantially equally spaced spots across the screen thereof the heights of which provide an indication of the respective time delay of each of said plurality of pairs of electroacoustic transducers.

6. Apparatus as set forth in claim 4, wherein said plurality of pairs of electroacoustic transducers include housing means for being mounted substantially transverse to one dimension of said sheet of material.

7. Ultrasonic apparatus for measuring the contour of a surface of a moving sheet of substantially solid material comprising, in combination: signal generator means providing a pulse output comprising pulses of high frequency electrical oscillations; a first plurality of electroacoustic transducers acting as transmitters mounted above said moving sheet with a predetermined air space being provided therebetween, said transducers including means for being coupled to said signal generator and being responsive to said pulses to respectively produce an ultrasonic wave to be emanated therefrom each time said pulses of high frequency electrical oscillations are applied thereto; a second plurality of electroacoustic transducers which are responsive to ultrasonic waves for producing an electrical signal therefrom, mounted above said moving sheet substantially transverse to said moving sheet and adapted to lie substantially parallel to said first plurality of electroacoustic transducers, said second plurality of transducers acting as receivers such that one transmitter and one receiver cooperate as a transmitter-receiver pair for measuring the elapsed time between the transmitting and receiving of a respective ultrasonic wave reflected from said moving sheet; a coincidence gate coupled to each of said second plurality of transducer means for receiving a first input signal therefrom; electronic shift register means coupled to each coincidence gate for selectively providing a second input signal thereto; first trigger means coupled between said shift register means and said signal generator means for providing a trigger to said shift register each time a pulse of said pulses of high frequency electrical oscillations is coupled to said first plurality of transducers from said signal generator means, said shift register means being adapted to successively provide an output signal from each coincidence gate; feedback means coupled to said electronic shift register means for recycling said shift register means after a predetermined count, said count being equal to the number of said second plurality of transducers; cathode ray tube means adapted to have a plurality of spots produced on the screen thereof and including horizontal and vertical deflection means, means for controlling the intensity of said spots; vertical sweep circuit means coupled to said vertical deflection means of said cathode ray tube and including means for receiving a reset signal each time a pulse of said pulses of high frequency electrical oscillations is coupled to said first plurality of transducers from said signal generator means; horizontal sweep circuit means coupled to said horizontal deflection means and including means for receiving a reset signal from said shift register means each time said shift register is reset; and circuit means coupling the output signal from each of said coincidence gates to said means for controlling the intensity of said plurality of spots on said cathode ray tube so that a display comprising a series of bright spots is displayed across said cathode ray tube face, the vertical position of each of said spots being a measure of the respective elapsed time between the transmitting and receiving of said respective ultrasonic wave for each of said transmitter-receiver pairs.

8. In contour gaging apparatus for a surface being analyzed, the combination of a plurality of pairs of ultrasonic transducers spaced across said surface and at a predetermined distance away from the surface, each of said pairs of transducers including one transmitting transducer and an associated receiving transducer arranged to detect ultrasonic wave energy transmitted from the transmitting transducer and reflected from said surface, means for simultaneously supplying bursts of ultrasonic wave energy to each of the transmitting transducers, a gate connected to the output of each of the receiving transducers, apparatus for enabling each of the gates in sequence, a cathode ray tube having a photoemissive surface, means for generating an electron beam which is directed against the photoemissive surface, horizontal and vertical deflection means for the electron beam, means coupled to the horizontal deflection means for causing said electron beam to sweep across said photoemissive surface once as said gates are enabled in sequence, means coupled to the vertical deflection means for causing said electron beam to scan in a vertical direction each time a burst of wave energy is produced by said ultrasonic wave energy supplying means, and means coupled to said electron beam generating means for varying the intensity of said electron beam each time an associated one of said gates is enabled.

9. Apparatus for analyzing the contour of the surface of substantially solid material comprising, in combination: a plurality of pairs of electroacoustic transducers mounted a predetermined distance away from said surface such that said solid material may be moved freely beneath said plurality of pairs of electroacoustic transducers, each of said pairs of electroacoustic transducers being comprised of a transmitter and a receiver; a pulse generator, producing pulsed electrical signals, coupled to said plurality of pairs of electroacoustic transducers, each of said transmitters being responsive to the pulsed electrical signals for producing an ultrasonic wave which is directed to said surface of substantially solid material and reflected therefrom to its respective receiver; indicator means for providing a display of the time delay between transmission and reception of said ultrasonic wave for each pair of said plurality of pairs of electroacoustic transducers; a plurality of coincidence gates respectively coupled to each of said receivers, electronic shift register means coupled to said plurality of coincidence gates for successively activating each of said plurality of coincidence gates so that an output from each of said receivers is successively coupled to said indicater means, and indicator control means coupled to said gating means and said pulse generator means for controlling said display so that a comparison of the respective time delays of each of said plurality of pairs of electroacoustic transducers provides an indication of the surface contour of said substantially solid sheet material.

10. In contour gaging apparatus for a surface being analyzed, the combination of a plurality of pairs of ultrasonic transducers spaced across said surface and at a predetermined distance way from the surface, each of said pairs of transducers including one transmitting transducer and an associated receiving transducer arranged to detect ultrasonic wave energy transmitted from the transmitting transducer and reflected from said surface, means for simultaneously supplying bursts of ultrasonic wave energy to each of the transmitting transducers, circuit means including a cathode ray tube coupled to the receiving transducers for visually displaying the respective time delays between transmission of a burst of ultrasonic wave energy from each transmitting transducer and receipt of that burst of energy by its associated receiving transducer, said circuit means further including a gate connected to the output of each of the receiving transducers, and apparatus for enabling each of the gates in sequence whereby the contour of the surface being analyzed will be displayed as a series of spots across the face of the cathode ray tube.

References Cited

UNITED STATES PATENTS

| | | | |
|---|---|---|---|
| 2,801,403 | 7/1957 | Kietz | 340—1 |
| 3,021,706 | 2/1962 | Cook | 73—67.8 |

FOREIGN PATENTS 1,113,401   8/1961   Germany.

RICHARD C. QUEISSER, *Primary Examiner.*

JOHN P. BEAUCHAMP, JR., *Examiner.*